Patented June 26, 1934

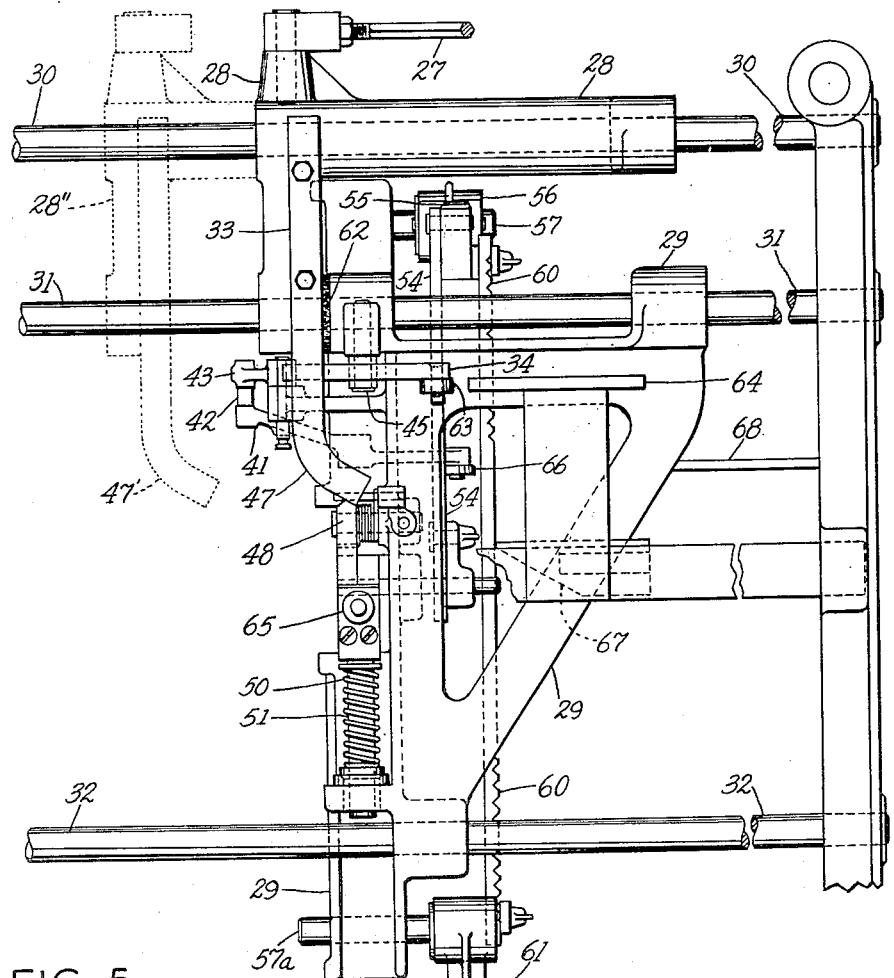
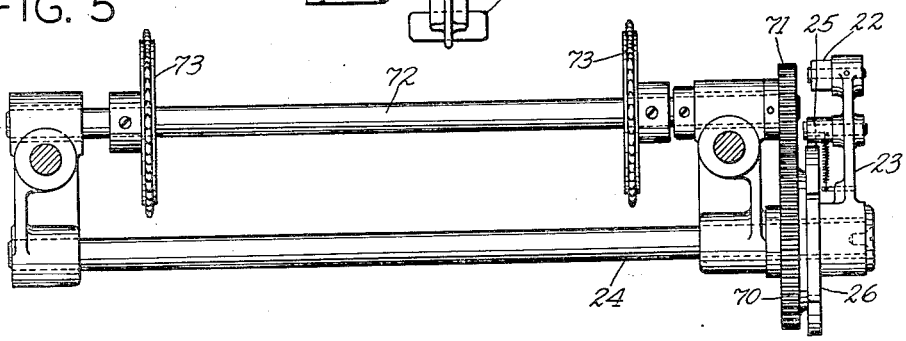

UNITED STATES PATENT OFFICE 1,964,085

SLICED BREAD SEPARATOR AND CONVEYER

Frank Reinhold Schmitt, Queens Village, N. Y., assignor to American Machine & Foundry Company, a corporation of New Jersey Application January 22, 1932, Serial No. 588,216
Renewed December 28, 1933

5 Claims. (Cl. 198—21)

This invention relates to sliced bread separators and conveyers, its main object being to provide novel means for conveying sliced loaves of bread in properly timed relation from a slicing machine running at any speed to a bread-wrapping machine capable of running at that speed or faster. With this and other objects not specifically mentioned in view, the invention consists in certain constructions and combinations hereinafter fully described and then specifically set forth in the claims hereunto appended.

To accomplish this object, the novel means is driven from the wrapping machine which is provided with a speed regulator so that it may be adjusted to a speed slightly in excess of that of the independently driven slicing machine, and the loaf conveying means is equipped with a feeler and a pair of grippers which are actuated to grip the ends of each loaf and transfer it to the wrapping machine after the loaf has raised the said feeler and thus put the gripper mechanism in operation. As the speed of the loaf conveying means differs from that of the slicer, there will be times when there is no loaf in position to be engaged by the grippers. In this case, the feeler remains in its down position, thereby arresting the grippers until the next loaf raises the feeler and actuates the gripper mechanism. In this manner, the operation of the wrapping machine is made independent of the operation of the slicing machine.

In the accompanying drawings:

Fig. 4 is a top view from line 4—4 of Fig. 2; and

Fig. 5 is an enlarged sectional view of the driving arrangement of the conveyer from line 5—5 of Fig. 1.

Figure 1:
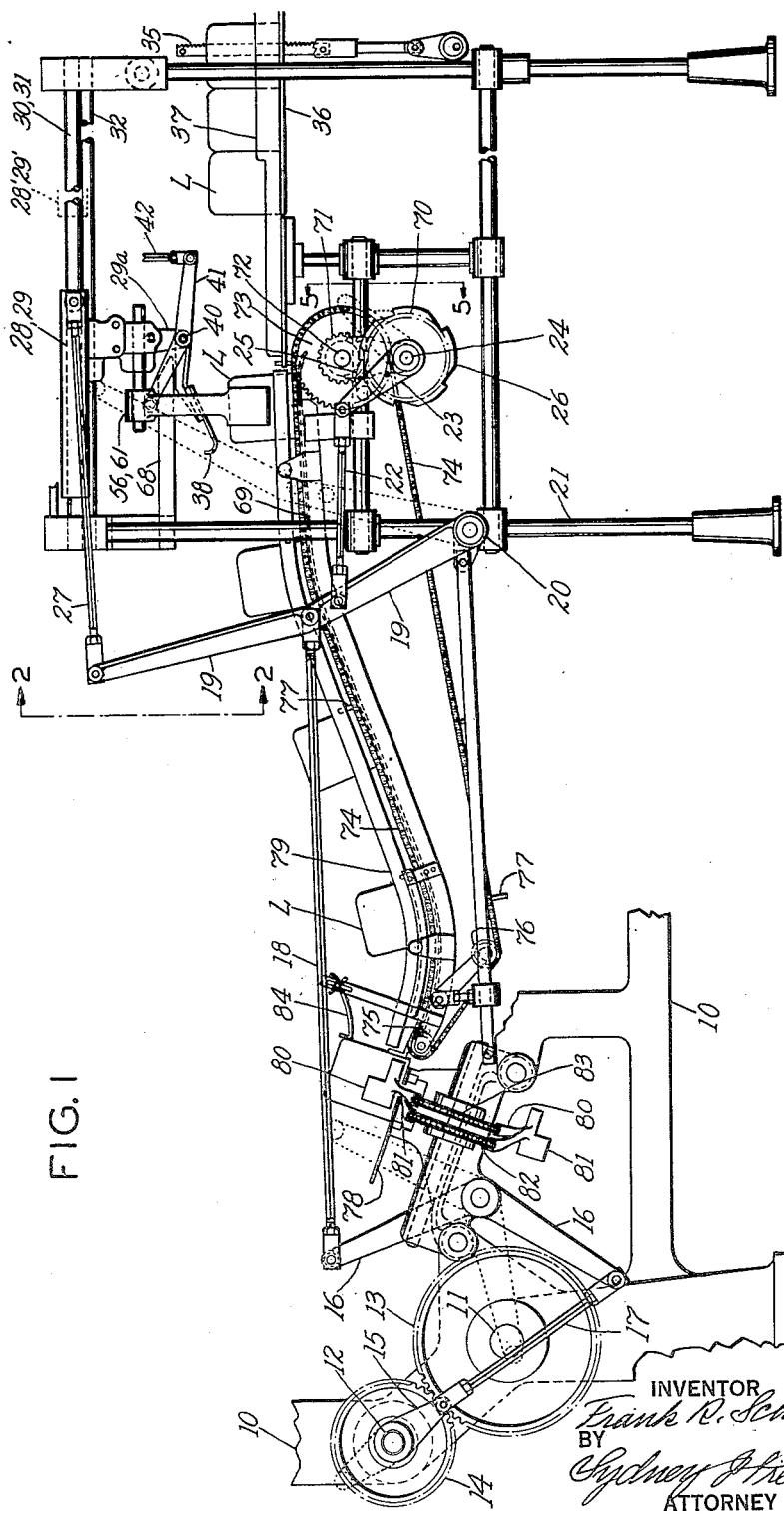
Fig. 1 is a side elevation of the novel sliced loaf conveying means showing its arrangement to transfer the sliced loaves from the slicing table of the slicing machine to the lifting table of the bread wrapping machine.

In carrying the invention into effect there is provided in combination with the slicing table of a bread slicing machine, means for intermittently advancing sliced loaves to a bread wrapping machine, and mechanism set into operation by engagement with a sliced loaf on said table for gripping the ends of the loaf and transferring it from said table to said means. In the preferred form of construction said means includes a runway having side guides for keeping the slices of the loaf together, conveyer chains running through said runway, and pushers adapted to engage and forward sliced loaves along the runway. In the best forms of construction said mechanism includes a slidable carriage, a feeler on said carriage adapted to engage a sliced loaf on the table, grippers on said carriage, means for reciprocating said carriage to bring the feeler into engagement with a sliced loaf on the table, means actuated by the engagement of the feeler with the loaf for causing said grippers to engage the ends of the loaf, and means for disengaging said grippers from the loaf when it is carried to said loaf advancing means by said grippers. These various means and parts may be widely varied in construction within the scope of the claims, for the particular device selected to illustrate the invention is but one of many possible concrete embodiments of the same. The invention, therefore, is not to be restricted to the specific construction shown and described.

Referring to the drawings, the side frames 10 of the wrapping machine carry the shafts 11 and 12. Fixed on the drive shaft 11 is a gear 13 meshing with a gear 14, on shaft 12, which also carries the crank 15 connected to the bell crank lever 16 by the connecting rod 17. The lever 16, through a link 18, actuates an arm 19 pivotally mounted on a bearing 20 of the frame 21. Attached to the arm 19 is a rod 22 connected to a crank 23 loosely mounted on shaft 24. A pawl 25 carried by the crank 23 engages with a ratchet 26 fixed on shaft 24, thereby intermittently driving the shaft 24. The arm 19 also actuates a rod 27 connected to a slide 28 mounted on the horizontal slide bars 30 and 31, which is coupled to the carriage 29 on the slide bars 31 and 32 by a latch 33 fixed on slide 28 engaging with a recess in swinging arm 34 carried by the carriage 29, see Fig. 3.

The loaf L, after passing through the knives 35 of the slicing machine, which may be disc knives, or reciprocating blades as shown, rests on the slicing table 36 carrying the side guides 37 which keep the slices of the loaf from separating. The driving means from the crank 15 moves the slide 28, and the carriage 29 through the latch 33 into the dotted positions 28' and 29', thereby carrying along the feeler 38 supported on carriage 29.

Figure 2:
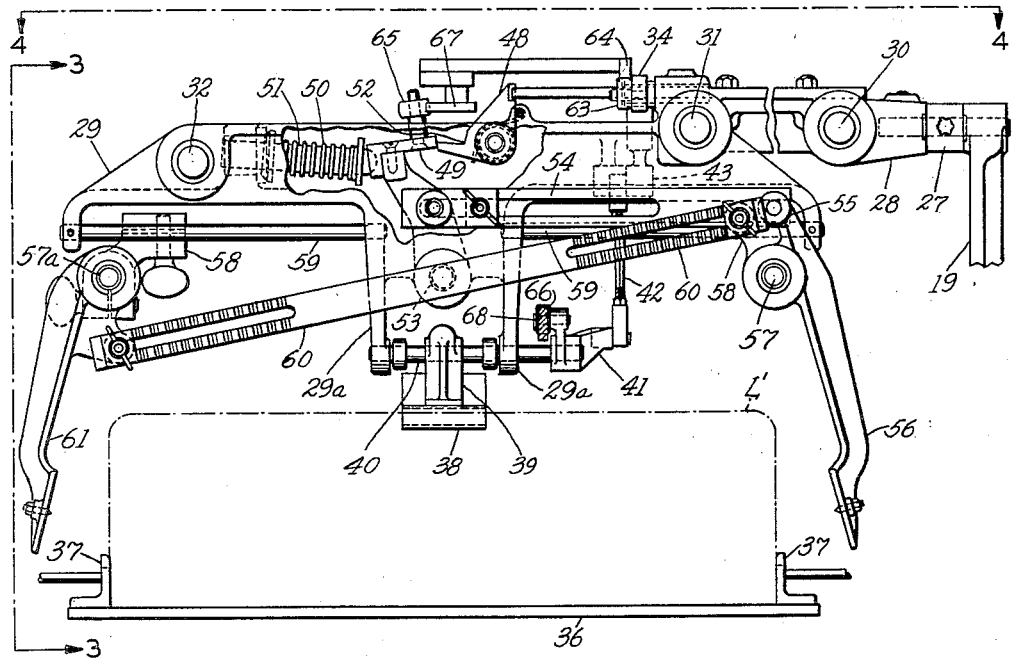
Fig. 2 is a detail end elevation of the loaf transferring mechanism forming a part of the conveying means taken on line 2—2 of Fig. 1.

As soon as the feeler 38, which is carried by an arm 39 clamped to the shaft 40, loosely mounted in arms 29a of carriage 29, encounters the loaf L resting on the slicing table 36, the said feeler is lifted by the loaf and thereby turns the shaft 40, see Fig. 2. Attached to shaft 40 is a spring-tensioned arm 41 which then, through the turning of shaft 40, moves downward causing a rod 42 pivoted to it to swing a support 43, pivoted on a stud 44 in carriage 29 away from under the arm 34 which is pivotally mounted on a stud 45 carried by the carriage 29. The arm 34 is thus free to allow a spring 46 to pull it downwards, thereby disengaging the coupling effected by the latch 33. The carriage 29 then remains stationary while the slide 28 continues moving the entire length of the stroke into the dotted position 28'', see Fig. 4. During this movement of the slide 28, the curved end 47 of the latch 33, in moving into dotted position 47', forces the pointed spring-tensioned trip 48 to turn about its pivot on carriage 29 and thus release the arm 49, see Fig. 2. A spring 50 mounted on the rod 51, extending from the arm 49 and having its outer end journaled in the carriage 29, holds the arm 49 against the ledge 52 of trip 48 when tripped. The arm 49 pivots on shaft 53 carried by the carriage 29. Attached to the arm 49 is an adjustable link 54 connected to the boss 55 of one of the grippers 56 which is mounted on a shaft 57 freely rotatable in bearing block 58 carried by the cross bars 59 of carriage 29. The gripper 56 is connected by an adjustable link 60 to the other gripper 61 which is mounted on a shaft 57a in a similar manner to gripper 56. The grippers 56 and 61 move inwardly against the ends of the loaf through the movement of the links 54 and 60 when the feeler 38 engages the loaf.

Figure 3:
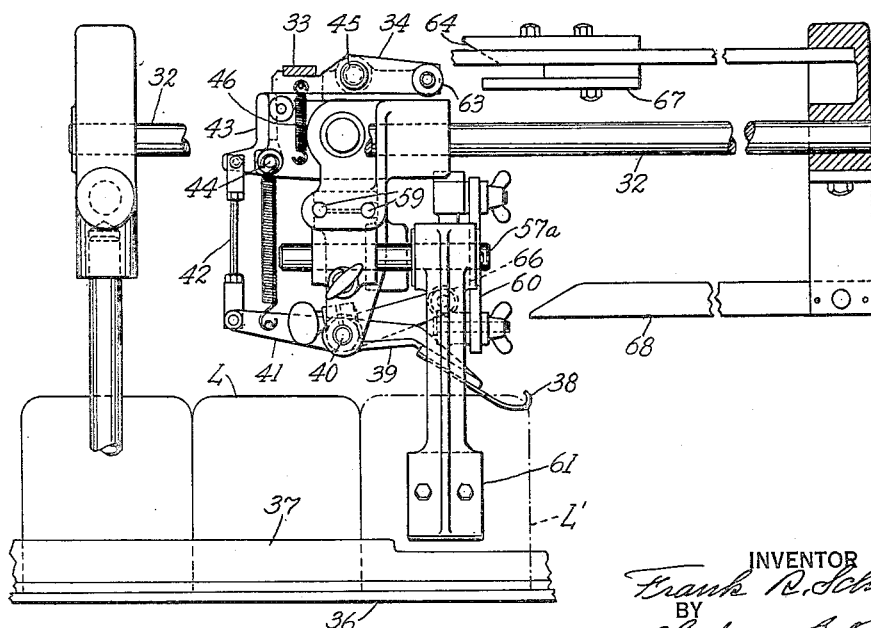
Fig. 3 is a partial side elevation on line 3—3 of Fig. 2.

However, when feeler 38 encounters a space between two of the incoming loaves L, it remains in its lowermost position and keeps the grippers 56 and 61 inoperative as shown by loaf L' in Figs. 2 and 3.

When the loaf L has been gripped by the grippers 56 and 61, the slide 28 begins its return stroke and in so doing, it strikes against the bumper 62, on carriage 29, see Fig. 4, and thus carries the latter along with it to the point where the gripped loaf L carried by it is to be discharged. The slide 28 and carriage 29, during their return movement, cause the roller 63 of arm 34 to engage with the cam 64, thereby returning the arm 34 to its former position to engage the latch 33. In the loaf discharging position, the roller 65 carried by arm 49 and the roller 66 carried by arm 41 encounter the cams 67 and 68 respectively, the cam 67 causing the grippers to separate and release the loaf and resetting the trip 48 to its former position to reengage the curved end of the latch while the cam 68 turns the shaft 40 to raise the feeler 38 above the loaf so that it will clear the loaf on its forward stroke. When the roller 66 leaves the cam 68 during the forward stroke of the carriage 29 the spring-tensioned arm 41, through the link 42, moves the support 43 back into position to maintain the arm 34 in engagement with the latch 33.

The loaf L then descends onto the conveyer 69, intermittently driven by the pawl 25 and ratchet 26 of shaft 24, Fig. 1. The shaft 24 carries a gear 70 adjustably fastened to ratchet 26 and meshing with a gear 71 on shaft 72 carrying sprockets 73 driving the chains 74 over the idler sprocket 75 and chain tightener sprocket 76. The chains 74 carry pushers 77 which engage with the loaves and convey them to the runway 78, side guides 79 keeping the slices from becoming disarranged on their travel to the runway 78. From runway 78, the sliced loaf enters into a clamp formed by pushers 80 and 81 carried by chains driven by the sprockets 82 and 83, the adjustably mounted guide 84 supporting the slices and preventing them from becoming disarranged. By a set of sprockets not shown, the idler sprockets 82 and 83 are intermittently driven in such a manner that they are idle when the conveyer chains 74 are moving, and vice versa. The sprockets 82 and 83, on resuming their travel, deliver the loaf to the lifting table of the wrapping machine.

What is claimed is:

1. The combination with means for intermittently advancing sliced loaves, of mechanism moving in synchronism with said means and set into operation by engagement with a sliced loaf of bread for gripping the ends of the loaf and transferring it to said means.

2. The combination with means for intermittently advancing sliced loaves, of mechanism set into operation by engagement with a sliced loaf of bread for gripping the ends of the loaf and transferring it to said means, said means including a runway having side guides arranged to engage the ends of the loaves for keeping the slices of the loaves together, intermittently driven conveyer chains running through said runway, and pushers on said chains adapted to engage the rear side of the sliced loaves and forward them along said runway.

3. The combination with means for intermittently advancing sliced loaves, of mechanism set into operation by engagement with a sliced loaf of bread for gripping the ends of the loaf and transferring it to said means, said mechanism including a slidable carriage, a feeler mounted on said carriage and adapted to engage a sliced loaf on said table, grippers mounted on said carriage and adapted to grip the ends of a sliced loaf, means for reciprocating said carriage to bring said feeler into engagement with a sliced loaf, means actuated by the engagement of said feeler with a sliced loaf for causing said grippers to engage the ends of the loaf, and means for disengaging said grippers from said loaf when it is carried to said loaf advancing means by said grippers.

4. Means for transferring sliced loaves of bread, comprising a slidable carriage, a feeler mounted on said carriage and adapted to engage a sliced loaf, grippers mounted on said carriage and adapted to grip the ends of a sliced loaf, means for reciprocating said carriage to bring said feeler into engagement with a sliced loaf, means actuated by the engagement of said feeler with a loaf for causing said grippers to grip the ends of the loaf, and means for disengaging said grippers from said loaf when it is carried to a predetermined position by said grippers.

5. Means for transferring sliced loaves of bread, comprising a slidable carriage, a feeler mounted on said carriage and adapted to engage a sliced loaf, grippers mounted on said carriage and adapted to grip the ends of a sliced loaf, means for reciprocating said carriage to bring said feeler into engagement with a sliced loaf, means actuated by the engagement of said feeler with a loaf for causing said grippers to grip the ends of the loaf, and means for disengaging said grippers from said loaf when it is carried to a predetermined position by said grippers, said means for reciprocating said carriage including a reciprocating slide, a latch fixed on said slide, and means on said carriage for engaging said latch and releasing it when said feeler encounters a sliced loaf.

FRANK REINHOLD SCHMITT.